(12) United States Patent
Elabellaoui et al.

(10) Patent No.: US 9,598,177 B2
(45) Date of Patent: Mar. 21, 2017

(54) AIRCRAFT THROTTLE CONTROL DEVICE INCLUDING AN ENGAGING ROLLER COUPLING

(75) Inventors: Hafid Elabellaoui, Paris (FR); Jean-Eric Besold, Palaiseau (FR); Marie-Noël Besold, legal representative, Saclay (FR); Aurélie Besold, legal representative, Etampes (FR); Stéphanie Besold, legal representative, Palaiseau (FR); Antoine Besold, legal representative, Saclay (FR); Sébasiten Pautard, Paris (FR); David Engler, Paris (FR); Etienne Merlet, Paris (FR)

(73) Assignee: SAGEM DEFENSE SECURITE, Paris (FR)

( * ) Notice: Subject to any disclaimer, the term of this patent is extended or adjusted under 35 U.S.C. 154(b) by 1359 days.

(21) Appl. No.: 13/500,861

(22) PCT Filed: Oct. 5, 2010

(86) PCT No.: PCT/EP2010/006056
§ 371 (c)(1),
(2), (4) Date: Apr. 6, 2012

(87) PCT Pub. No.: WO2011/042146
PCT Pub. Date: Apr. 14, 2011

(65) Prior Publication Data
US 2014/0190304 A1    Jul. 10, 2014

(30) Foreign Application Priority Data
Oct. 6, 2009 (FR) ..................... 09 04759

(51) Int. Cl.
*B64D 31/04* (2006.01)
*B64D 31/06* (2006.01)

(52) U.S. Cl.
CPC ............. *B64D 31/06* (2013.01); *B64D 31/04* (2013.01); *Y10T 74/20238* (2015.01)

(58) Field of Classification Search
CPC ................................ B64D 31/04; B64D 31/06
(Continued)

(56) References Cited

U.S. PATENT DOCUMENTS 2,594,927 A * 4/1952 Holt ...................... B64C 11/305
244/81
3,101,821 A * 8/1963 Henry .................. B63H 21/213
477/113
(Continued)

FOREIGN PATENT DOCUMENTS

GB    1 450 076 A    9/1976

*Primary Examiner* — William C Joyce
(74) *Attorney, Agent, or Firm* — Muncy, Geissler, Olds & Lowe, P.C.

(57) ABSTRACT

An aeroengine control device comprising a mount, having pivotally mounted thereon a code wheel together with a main lever and a secondary lever, both for turning the code wheel, each lever being movable between a rest position and a maximum actuation position, the secondary lever being mounted to pivot on the main lever. A connecting rod connects the secondary lever in permanent manner to the code wheel and the main lever is provided with a connection member arranged to co-operate with a portion in relief secured to the code wheel and with a portion in relief secured to the mount in such a manner that the connection member attaches to the code wheel when the main lever is moved while the secondary lever is in its rest position and attaches to the mount, thereby releasing the code wheel to turn, when the secondary lever is moved while the main lever is in its rest position, while movement of either lever is prevented when the other lever is away from its rest position.

19 Claims, 3 Drawing Sheets

(58) Field of Classification Search
USPC .......... 74/480 R, 483 R; 244/81, 110 B, 220, 244/224, 225; 416/25
See application file for complete search history.

(56) References Cited

U.S. PATENT DOCUMENTS 3,279,184 A * 10/1966 Felix .......................... F02K 1/76
60/224
3,444,765 A     5/1969 Champs
3,572,155 A * 3/1971 Banks ..................... B64D 31/04
74/490.14
5,492,511 A * 2/1996 Kozminski .............. G05G 1/04
477/22

* cited by examiner

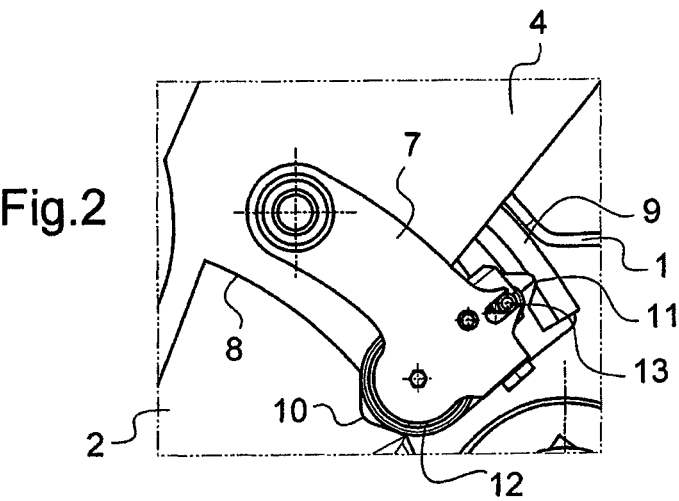
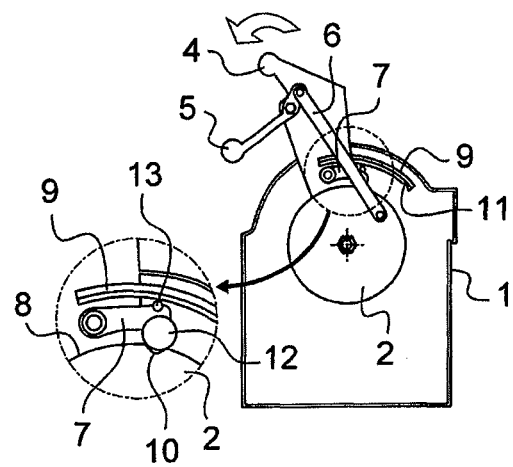
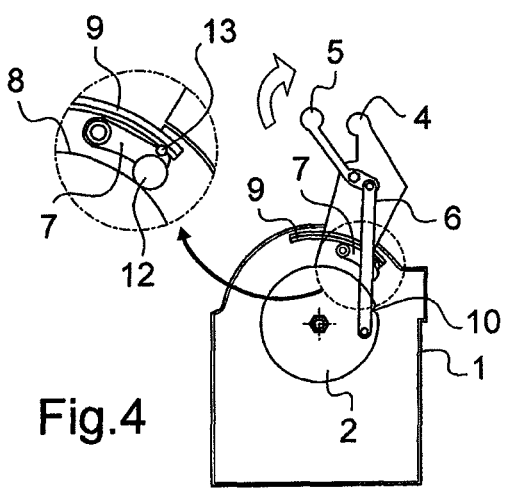

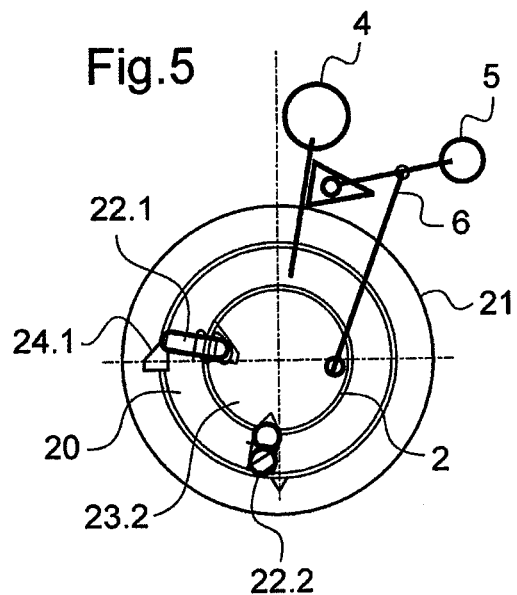
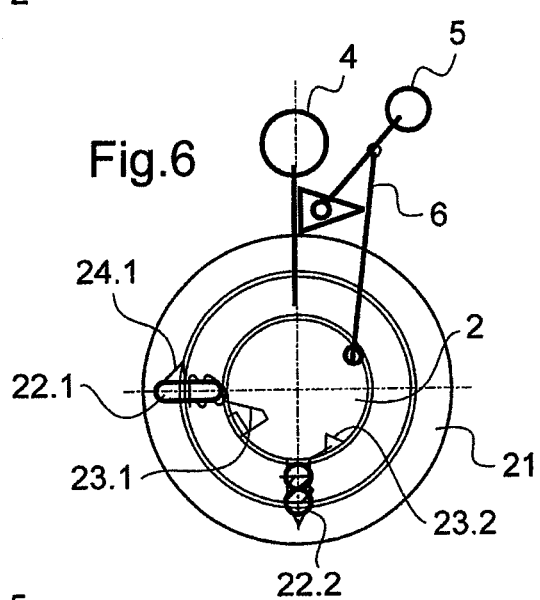
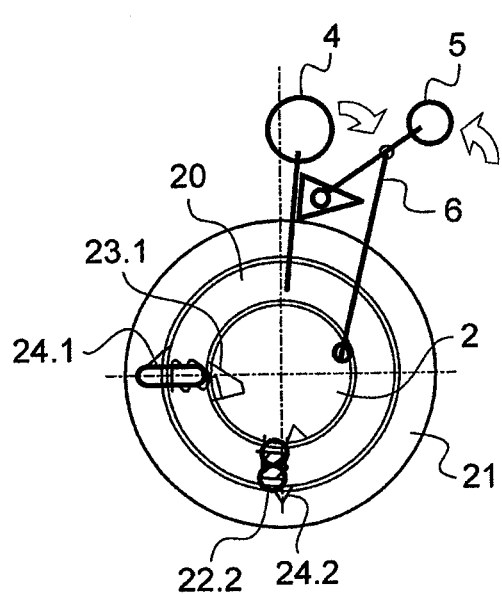

AIRCRAFT THROTTLE CONTROL DEVICE INCLUDING AN ENGAGING ROLLER COUPLING

FIELD OF THE INVENTION

The present invention relates to an aeroengine throttle control device.

BACKGROUND OF THE INVENTION

Modern turbojets are fitted with a thrust reversal device that enables a fraction of the exhaust stream leaving the turbojet to be directed towards the front of the turbojet (generally in a direction that makes an angle of about 45° relative to the forward direction of the aircraft) in order to assist the slowing down action of brakes while the aircraft is landing. Various reversal devices are in existence, and in particular devices using doors and devices using grids.

There also exist propeller engines that incorporate a thrust reversal device arranged to reverse propeller pitch.

The cockpit of an aircraft having such an engine is fitted with a throttle control device that enables the pilot to control both the rate at which fuel is admitted into the combustion chamber of the engine, and also the thrust reversal device. For this purpose, the control device comprises a mount having pivotally mounted thereon both a code wheel and a main lever or throttle lever, together with a secondary lever or thrust reversal lever, which levers are arranged to turn the code wheel. The code wheel is associated with sensors connected to an engine control unit. Each lever is movable between a rest position and a maximum actuation position. The thrust reversal lever is hinged to the throttle lever. The assembly comprising both levers is connected to the code wheel via a complex coupling system including an intermediate wheel on the pivot axis of the throttle lever and which is connected to the code wheel. Drive of the intermediate wheel by the levers is under the control of a device that prevents either lever from moving if the other lever is away from its rest position. That device relies on cams, toggle-action parts, or parts having strokes that present cusps, i.e. points where movement is reversed.

In the more elaborate systems, the stroke of each lever includes a transition zone in the immediate vicinity of its rest position. When a lever is in the transition zone and the other lever is moved away from its rest position, the first lever is returned to its rest position.

The coupling system occupies a considerable amount of space and is heavy, in particular because of the intermediate wheel. In addition, the forces transmitted are high and require parts of the coupling system to be dimensioned accordingly, thereby adding to the weight and the volume of the coupling system, particularly since any element in the coupling system between either of the levers and the code wheel must be duplicated in order to ensure the redundancy that is essential for the safety of the device.

OBJECT AND SUMMARY OF THE INVENTION

An object of the invention is to provide means making it possible to improve at least some of the above drawbacks.

To this end, the invention provides an aeroengine control device comprising a mount, having pivotally mounted thereon a code wheel together with a main lever and a secondary lever, both for turning the code wheel, each lever being movable between a rest position and a maximum actuation position, the secondary lever being mounted to pivot on the main lever, wherein a connecting rod connects the secondary lever to the code wheel in permanent manner, and wherein the main lever is provided with a connection member arranged to co-operate with a portion in relief of the code wheel and a portion in relief of the mount in such a manner that the connection member attaches to the code wheel when the main lever is moved while the secondary lever is in the rest position and attaches to the mount while releasing rotation of the code wheel when the secondary lever is moved while the main lever is in the rest position, with movement of either lever being prevented when the other lever is away from its rest position.

Thus, the direct and permanent connection of the secondary lever to the code wheel makes it possible to have a structure that is simple. In addition, the main lever is secured either to the code wheel or to the mount. When the main lever is secured to the code wheel, the secondary lever cannot move the code wheel independently of the main lever. When the main lever is secured to the mount, the main lever is blocked against pivoting, such that only the secondary lever can move the code wheel independently of the main lever.

In a first embodiment, the connection member comprises an arm having one end hinged to the main lever and a free end arranged to co-operate with the portions in relief and, advantageously, the free end is enlarged and is received between two walls that extend in circular arcs about the axis of the code wheel, one of them being secured to the code wheel and the other to the mount, the walls being spaced apart from each other and each including a notch for receiving a portion of the connection member in such a manner that turning of the code wheel relative to the mount is possible only when the connection member is received in one or other of the notches, the notches facing each other when the code wheel is in its position that is common to both of the levers being in their rest positions and the free end being preferably urged resiliently against the wall secured to the code wheel.

This embodiment possesses a structure that is extremely simple. Forces are transmitted from the levers to the code wheel in direct manner, thereby enabling undesired friction, lever effects, or jamming to be limited. These improvements associated with the direct connection thereby require very few parts and contribute to making the device intrinsically reliable (not taking redundancy into consideration). The small number of mechanical connections also contributes to the accuracy with which the positions of the levers are relayed.

In a second embodiment, the free end of the arm is provided with at least one wheel mounted to rotate about an axis parallel to the axis of rotation of the code wheel.

This embodiment presents advantages similar to the first embodiment with a structure that is slightly more complex, while limiting the friction and wear associated with moving the levers.

BRIEF DESCRIPTION OF THE DRAWINGS

Other characteristics and advantages of the invention appear on reading the following description of particular, non-limiting embodiments of the invention.

Reference is made to the accompanying drawings, in which:

FIG. 2 is an enlarged view of zone II of FIG. 1;

FIGS. 3 and 4 are diagrammatic views, each with an enlarged zone showing the maximum actuation positions of the levers in the device in accordance with the first embodiment; and FIGS. 5, 6, and 7 are views analogous to FIG. 1, but simplified, showing a control device in a second embodiment of the invention.

MORE DETAILED DESCRIPTION

Figure 1:
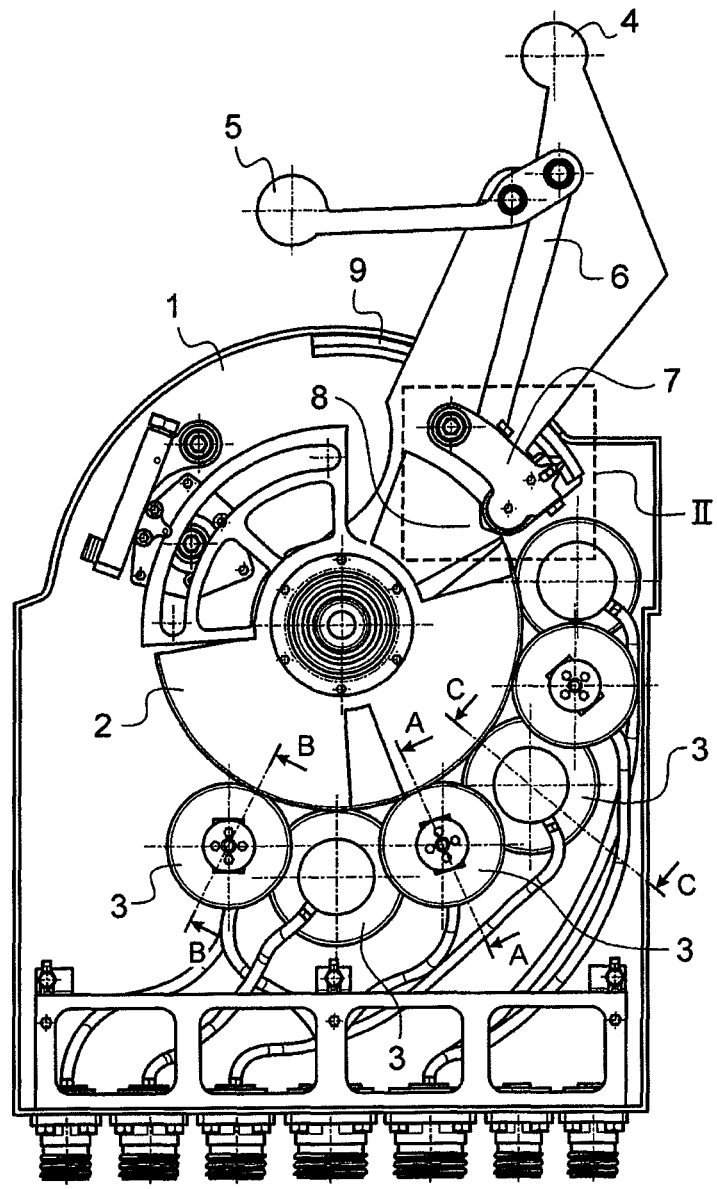
FIG. 1 is a section view of a control device in accordance with a first embodiment of the invention.

The throttle control device described herein is arranged for controlling both the flow rate of fuel and a thrust reversal device of an aeroengine.

With reference to FIGS. 1 to 4, the control device comprises a mount 1 having a code wheel 2 pivotally mounted thereon. Sensors 3 for sensing the angular position of the code wheel 2 are mounted on the mount 1 in register with the periphery of the code wheel 2.

A main lever 4 is mounted on the mount 1 to pivot about the axis of the code wheel 2. The main lever 4 comprises two parallel plates having a secondary lever 5 mounted between them to pivot about an axis parallel to the axis of rotation of the code wheel 2 and of the main lever 4. The levers 4 and 5 pivot between a rest position (shown in FIG. 1 for both levers), and a maximum actuation position (shown in FIG. 3 for the main lever 4 and in FIG. 4 for the secondary lever 5). The main lever 4 is a throttle control lever serving to control the flow rate of fuel, and its maximum actuation position is on the left in FIG. 1: the pilot pushes the main lever 4 in order to increase the power delivered by the engine (FIG. 3). The secondary lever 5 is a lever for controlling the thrust reversal device, and its maximum actuation position is on the right in FIG. 1: the pilot pulls on the secondary lever 5 in order to cause firstly the thrust reversal device to be deployed and secondly to increase the power delivered by the engine (FIG. 4).

The secondary lever 5 is connected to the code wheel 2 in direct and permanent manner by a connecting rod 6 that extends between the plates of the main lever 4.

The main lever 4 is provided with a coupling member comprising an arm 7 having one end hinged to the main lever 4 and a free end arranged to co-operate with a portion in relief secured to the code wheel 2, and another portion in relief secured to the mount 1.

The free end of the arm 7 is received between two walls that face each other and that extend over a circular arc about the axis of the code wheel 2. One of the walls, given reference 8, is secured to the code wheel 2 while the other wall, given reference 9, is secured to the mount 1.

The walls 8 and 9 are spaced apart from each other, each including a notch 10, 11 for receiving a portion of the free end of the arm 7. The notches face each other when the code wheel 2 is in a position common to the rest positions of both levers 4 and 5.

The free end of the arm 7 in this example is provided with two wheels 12, 13 that rotate about an axis parallel to the axis of rotation of the code wheel 2 and that are in alignment in a substantially radial direction of the code wheel 2 so as to run respectively along the wall 8 and along the wall 9. In this example, the spacing between the wheels 12 and 13 is constant.

The wheels 12 and 13 may be received respectively in the notch 10 and in the notch 11 so that rotation of the code wheel 2 relative to the mount 1 is not possible when one or other of the wheels 12 and 13 is received in the corresponding notch 10 or 11, i.e. the sum of the radii of the wheels plus their spacing is substantially equal to the sum of the distance between the walls plus the depth of one of the notches.

A spring extends between the arm 7 and the main lever 4, between the plates thereof, in order to urge the wheel 12 resiliently against the wall 8 that is secured to the code wheel 2.

It will be understood that when the notches 10 and 11 are facing each other (the position of the code wheel 2 common to the rest positions of both levers 4 and 5, see FIG. 1), the main lever 4 can be moved towards its maximum actuation position. In so doing (see FIG. 3), the wheel 12 is received in the notch 10 and drives the code wheel 2, with the wall 9 holding the wheel 12 in the notch 10. The secondary lever 5 is blocked.

When the notches 10 and 11 face each other (position of the code wheel 2 that is common to the rest positions of both levers 4 and 5), the secondary lever 5 can be moved towards its maximum actuation position, driving the code wheel via the connecting rod 6. The code wheel 2 then pushes the wheel 12 out from the notch 10 (see FIG. 4) and causes the wheel 13 to engage in the notch 11 in which it is held by the wall 8. The main lever 4 is thus connected to the mount 1 and blocked.

The connection member is thus arranged to co-operate with a portion in relief of the code wheel 2 and a portion in relief of the mount 1 in such a manner that the connection member attaches to the code wheel 2 when the main lever 4 is moved while the secondary lever 5 is in the rest position, and attaches to the mount 1, thereby releasing the code wheel 2 to turn when the secondary lever 5 is moved while the main lever 4 is in the rest position, while preventing either lever from moving when the other lever is away from its rest position.

It should be observed that each of the notches 10 and 11 is provided with a ramp that serves to define a transition zone: when the wheel 12 or the wheel 13 is on the ramp of the notch 10 or 11 and a first one of the levers 5 or 4 is moved, then the ramp serves to return the other lever, respectively 4 or 5 to the rest position while the movement of the first lever 5 or 4 continues.

The spacing between the wheels 12 and 13 and their diameters, and the angles of inclination of the ramps serve to determine the extent of the transition zone for each of the two levers independently. Thus, for example:

if the main lever 4 is offset by less than two degrees from its rest position, any movement of the secondary lever 5 away from its rest position causes the main lever 4 to return to its rest position; and if the secondary lever 5 is offset by less than fifteen degrees from its rest position, any movement of the main lever 4 away from its rest position causes the secondary lever 5 to return to its rest position.

With reference to FIGS. 5 to 7, the device in accordance with the second embodiment of the invention comprises as above: a mount 1, a code wheel 2, sensors 3, a main lever 4, a secondary lever 5, and a connecting rod 6 connecting the secondary lever 5 in direct and permanent manner to the code wheel 2.

The connection member for connecting the main lever 4 to the code wheel 2 comprises a ring 20 surrounding the code wheel 2 and received between a peripheral surface of the code wheel 2 and a wall 21 of the mount 1 that surrounds the ring 20. The ring 20 slidably receives two pins 22.1 and 22.2 having ends that are arranged to co-operate with notches 23.1 and 23.2 that are formed in the code wheel 2, and with notches 24.1 and 24.2 that are formed in the wall 21 of the mount 1, thereby enabling the ring 20 to be constrained in rotation selectively either with the code wheel 2 or with the wall 21 of the mount 1. The pin 22.1 is a peg that is urged resiliently to project out from the ring 20. The pin 22.2 is made up of two balls that are held apart from each other while projecting internally and externally relative to the ring 20 by a resilient member.

The notches 23.1 and 23.2 and the notches 24.1 and 24.2 face each other in pairs when the code wheel 2 is in its position common to the rest positions of both levers 4 and 5. In this position, the pin 22.1 projects into the notch 24.1 and the pin 22.2 has its ends projecting respectively into the notches 23.2 and 24.2.

As in the first embodiment, starting from the position of the code wheel that is common to both of the levers 4 and 5 being in their rest positions:

when the lever 4 is moved towards its maximum actuation position (situated on the right in FIGS. 5 to 7), the pin 22.2 is expelled from the notch 24.2 and is held blocked projecting into the notch 23.2, thereby blocking the secondary lever 5 relative to the ring 20, the pin 22.1 is expelled from the notch 24.1 and is held blocked projecting into the notch 23.1 so as to constrain the ring 20 and the code wheel 2 together in rotation (FIG. 5); and when the lever 5 is moved towards its maximum actuation position, the pin 22.2 is expelled from the notch 23.2 and is held blocked projecting into the notch 24.2, thereby blocking the lever 4, and the pin 22.1 is expelled from the notch 23.1 and is held blocked projecting in the notch 24.1 (FIG. 6).

As in the first embodiment, the notches 23.1 and 24.1 have ramps that enable transition zones to be defined.

The optional separation of the functions of alternately locking the throttle levers 4 and 5 by the pin 22.2 (co-operating with the portions in relief 23.2 and 24.2), and controlling return of the throttle levers from their respective transition zones by means of the pin 22.1 (co-operating with the portions in relief 23.1 and 24.1) provides greater flexibility in defining the movement relationships.

Naturally, the invention is not limited to the embodiments described but covers any variant coming within the ambit of the invention as defined by the claims.

In particular, the free end of the arm may have a single wheel mounted to rotate about an axis parallel to the axis of rotation of the code wheel, or it may have two wheels mounted to rotate about respective axes parallel to the axis of rotation of the code wheel and in alignment in a direction that is substantially radial relative to the code wheel, the wheels being in fixed positions or movable relative to each other parallel to the substantially radial direction while being urged resiliently apart from each other.

The free end of the arm may also be provided with a peg that slides substantially radially, which peg may be of constant length or suitable for lengthening in a substantially radial direction, being urged resiliently towards a spaced-apart position.

The arm 7 may be omitted, with the above-mentioned wheel(s) or pegs being mounted directly on the structure of the lever 4, providing it is provided with guidance enabling them to move substantially radially.

In order to reduce mechanical clearances and make the part easier to fabricate, it is possible to provide a device for adjusting the spacing between the wheels.

The device may optionally include means for defining controlled forced relationships and/or movement relationships for automatically returning at least one of the levers to its rest position, said means possibly comprising the profiles of the portions in relief.

The assembly comprising the code wheel and the levers may optionally be associated with friction means acting in the vicinity of the axis or on the outer periphery of the code wheel.

What is claimed is:

1. An aeroengine control device comprising both a mount, having pivotally mounted thereon a code wheel together with a main lever and a secondary lever, both for turning the code wheel, each lever being movable between a rest position and a maximum actuation position, the secondary lever being mounted to pivot on the main lever, wherein a connecting rod connects the secondary lever to the code wheel in permanent manner, and wherein the main lever is provided with a connection member arranged to co-operate with a notch secured to the code wheel and a notch secured to the mount in such a manner that the connection member attaches to the code wheel when the main lever is moved while the secondary lever is in the rest position and attaches to the mount while releasing rotation of the code wheel when the secondary lever is moved while the main lever is in the rest position, with movement of either lever being prevented when the other lever is away from its rest position.

2. The device according to claim 1, wherein the connection member comprises an arm having one end hinged to the main lever and a free end arranged to co-operate with the notches.

3. The device according to claim 1, wherein the connection member is received between two walls that extend in circular arcs about the axis of the code wheel, one of them being secured to the code wheel and the other to the mount, the walls being spaced apart from each other and each including one of the notches for receiving a portion of the connection member in such a manner that turning of the code wheel relative to the mount is possible only when the connection member is received in one of the notches, the notches facing each other when the code wheel is in its position that is common to both of the levers being in their rest positions.

4. The device according to claim 3, wherein the connection member is urged resiliently against the wall secured to the code wheel.

5. The device according to claim 3, wherein the connection member is provided with at least one wheel mounted to rotate about an axis parallel to the axis of rotation of the code wheel.

6. The device according to claim 5, wherein the connection member is provided with two wheels mounted to pivot about respective axes parallel to the axis of rotation of the code wheel and in alignment in a direction that is substantially radial relative to the code wheel.

7. The device according to claim 6, wherein the wheels are movable relative to each other parallel to the substantially radial direction and are urged resiliently towards a position in which they are spaced apart from each other.

8. The device according to claim 3, wherein the notches include ramps defining transition zones in the vicinity of the rest position such that when a first one of the levers is in the transition zone, movement of the other lever towards its maximum actuation position causes the first lever to return to its rest position.

9. The device according to claim 1, wherein the connection member includes at least one element that is movable in translation in a direction that is substantially radial relative to the code wheel.

10. The device according to claim 1, wherein the main lever is mounted to pivot about the axis of the code wheel.

11. The device according to claim 1, wherein the connection member comprises at least a ring segment surrounding the code wheel and being received between a peripheral surface of the code wheel and a wall of the mount surrounding the ring segment, the ring segment slidably receiving at least one pin having ends arranged to co-operate with the notches formed in the code wheel and with the wall of the mount in order to secure the ring segment in rotation selectively with the code wheel or with the wall of the mount.

12. The device according to claim 11, having two pins, one performing a locking function and the other performing a function of returning to the rest position when in the transition zone in co-operation with the corresponding notches.

13. The device according to claim 11, wherein the notches include ramps defining transition zones in the vicinity of the rest position such that when a first one of the levers is in the transition zone, movement of the other lever towards its maximum actuation position causes the first lever to return to its rest position.

14. The device according to claim 1, including definition means for defining controlled force relationships and/or movement relationships for automatically returning at least one of the levers to its rest position.

15. The device according to claim 14, wherein said definition means comprise profiles of the notches.

16. The device according to claim 1, wherein the main lever has two plates with the secondary lever and the connecting rod being mounted between them.

17. The device according to claim 1, wherein the assembly comprising the code wheel and the levers is associated with friction means acting in the vicinity of the axis or in the vicinity of the outer periphery of the code wheel.

18. The device according to claim 1, wherein the connection member is urged resiliently against a wall secured to the code wheel and provided with one of the notches.

19. The device according to claim 1, wherein the connection member is provided with at least one wheel mounted to rotate about an axis parallel to the axis of rotation of the code wheel.

* * * * *